US005434992A

United States Patent [19]

Mattson

[11] Patent Number: 5,434,992

[45] Date of Patent: Jul. 18, 1995

[54] METHOD AND MEANS FOR DYNAMICALLY PARTITIONING CACHE INTO A GLOBAL AND DATA TYPE SUBCACHE HIERARCHY FROM A REAL TIME REFERENCE TRACE

[75] Inventor: Richard L. Mattson, San Jose, Calif.

[73] Assignee: International Business Machines Corporation, Armonk, N.Y.

[21] Appl. No.: 940,560

[22] Filed: Sep. 4, 1992

[51] Int. Cl.[6] ........................ G06F 12/00; G06F 13/00

[52] U.S. Cl. .............................. 395/425; 364/DIG. 1; 364/DIG. 2; 364/243.45; 364/245; 364/246.12; 364/246.13; 364/246.3; 364/966.4

[58] Field of Search ................. 395/425; 364/200 MS, 364/900 MS, 243.45, 245, 246.12, 246.13, 246.3, 966.4

[56] References Cited

U.S. PATENT DOCUMENTS

| | | | |
|---|---|---|---|
| 4,754,394 | 6/1988 | Brantley, Jr. et al. | 395/400 |
| 4,905,141 | 2/1990 | Brenza | 395/425 |
| 5,285,528 | 2/1994 | Hart | 395/725 |
| 5,341,483 | 8/1994 | Frank et al. | 395/400 |

OTHER PUBLICATIONS

Mattson, "Evaluation Techniques for Storage Hierarchies", 1970, vol. 9, #2, pp. 78-117.

*Primary Examiner*—Rebecca L. Rudolph
*Assistant Examiner*—Frank J. Asta
*Attorney, Agent, or Firm*—R. Bruce Brodie; Paik Saber

[57] ABSTRACT

A method and means is disclosed for dynamically partitioning an LRU cache partitioned into a global cache storing referenced objects of k different data types and k local caches storing objects of a single type. Referenced objects are stored in the MRU position of the global cache and overflow is managed by destaging the LRU object from the global to the local cache having the same data type. Dynamic partitioning is accomplished by recursively creating and maintaining from a trace of objects an LRU list of referenced objects and associated data structures for each subcache, creating and maintaining a multi-planar array of partition distribution data from the lists and the trace as a collection of all possible of maximum and minimum subcache sizing, optimally resizing the subcache partitions by applying a dynamic programming heuristic to the multiplanar array, and readjusting the partitions accordingly.

9 Claims, 10 Drawing Sheets

DYNAMIC SUBCACHE SPACE ALLOCATION

SYSTEM WITH MULTIPLE CACHES

DATA TYPE T1

MINIMUM COUNTERS

DataType T1 Subcache Size

| Global Subcache Size | 0 | 1 | 2 | 4 | 8 | 16 | 32 | 64 |
|---|---|---|---|---|---|---|---|---|
| 0 | 0 | 14 | 14 | 20 | 12 | 0 | 0 | 38 |
| 1 | 12 | 6 | 22 | 20 | 0 | 0 | 0 | 38 |
| 2 | 4 | 12 | 20 | 12 | 0 | 0 | 0 | 38 |
| 4 | 10 | 14 | 8 | 12 | 0 | 0 | 0 | 38 |
| 8 | 12 | 10 | 12 | 0 | 0 | 0 | 0 | 38 |
| 16 | 8 | 14 | 0 | 0 | 0 | 0 | 0 | 38 |
| 32 | 14 | 0 | 0 | 0 | 0 | 0 | 0 | 38 |
| 64 | 38 | 0 | 0 | 0 | 0 | 0 | 0 | 0 |

Set T1CMIN of r * c counters

DATA TYPE T2

DataType T2 Subcache Size

| Global Subcache Size | 0 | 1 | 2 | 4 | 8 | 16 | 32 | 64 |
|---|---|---|---|---|---|---|---|---|
| 0 | 0 | 34 | 27 | 17 | 9 | 3 | 0 | 12 |
| 1 | 18 | 32 | 19 | 13 | 6 | 2 | 0 | 12 |
| 2 | 21 | 25 | 13 | 10 | 3 | 0 | 0 | 12 |
| 4 | 19 | 18 | 10 | 4 | 0 | 0 | 0 | 12 |
| 8 | 16 | 13 | 2 | 1 | 0 | 0 | 0 | 12 |
| 16 | 12 | 4 | 0 | 0 | 0 | 0 | 0 | 12 |
| 32 | 4 | 0 | 0 | 0 | 0 | 0 | 0 | 12 |
| 64 | 12 | 0 | 0 | 0 | 0 | 0 | 0 | 0 |

Set T2CMIN of r * c counters

MAXIMUM COUNTERS

DataType T1 Subcache Size

| Global Subcache Size | 0 | 1 | 2 | 4 | 8 | 16 | 32 | 64 |
|---|---|---|---|---|---|---|---|---|
| 0 | 0 | 12 | 10 | 13 | 12 | 7 | 6 | 38 |
| 1 | 12 | 6 | 16 | 14 | 6 | 6 | 0 | 38 |
| 2 | 4 | 8 | 16 | 8 | 12 | 0 | 0 | 38 |
| 4 | 10 | 12 | 6 | 16 | 0 | 0 | 0 | 38 |
| 8 | 12 | 8 | 14 | 0 | 0 | 0 | 0 | 38 |
| 16 | 8 | 14 | 0 | 0 | 0 | 0 | 0 | 38 |
| 32 | 14 | 0 | 0 | 0 | 0 | 0 | 0 | 38 |
| 64 | 38 | 0 | 0 | 0 | 0 | 0 | 0 | 0 |

Set T1CMAX of r * c counters

DataType T2 Subcache Size

| Global Subcache Size | 0 | 1 | 2 | 4 | 8 | 16 | 32 | 64 |
|---|---|---|---|---|---|---|---|---|
| 0 | 0 | 27 | 21 | 20 | 12 | 5 | 5 | 12 |
| 1 | 18 | 21 | 23 | 12 | 10 | 5 | 1 | 12 |
| 2 | 21 | 14 | 29 | 9 | 7 | 2 | 0 | 12 |
| 4 | 19 | 10 | 8 | 10 | 4 | 0 | 0 | 12 |
| 8 | 16 | 5 | 5 | 4 | 2 | 0 | 0 | 12 |
| 16 | 12 | 1 | 1 | 1 | 1 | 0 | 0 | 12 |
| 32 | 4 | 0 | 0 | 0 | 0 | 0 | 0 | 12 |
| 64 | 12 | 0 | 0 | 0 | 0 | 0 | 0 | 0 |

Set T2CMAX of r * c counters (2 * k) SETS OF COUNTERS, INITIALLY SET TO ZERO.
TWO SETS OF COUNTERS FOR EACH DataType,
ONE FOR MINIMUM COUNTS, ONE FOR MAXIMUM COUNTS.

*FIG. 4*

LRU List

| IN<br>Item Name | IDT<br>Item DataType | GN<br>Group Number g |
|---|---|---|
| 38 | T1 | 1 |
| 14 | T2 | 2 |
| 97 | T2 | 3 |
| 18 | T1 | 3 |
| 32 | T2 | 4 |
| 46 | T1 | 4 |
| 88 | T1 | 4 |
| 71 | T1 | 4 |
| 19 | T2 | 5 |
| 22 | T1 | 5 |
| 36 | T2 | 5 |
| 90 | T2 | 5 |
| 26 | T1 | 5 |
| 83 | T2 | 5 |
| 25 | T1 | 5 |
| 75 | T1 | 5 |
| 43 | T2 | 6 |

Pre-Count Vectors

| GN<br>Group Number g | SS<br>Subcache Size | MNI<br>Maximum Number of Items in group g | CNI<br>Current Number of Items in group g | T1<br>Number of Items with DataType T1 in group g | T2<br>Number of Items with DataType T2 in group g |
|---|---|---|---|---|---|
| 0 | 0 | 0 | 0 | 0 | 0 |
| 1 | 1 | 1 | 1 | 1 | 0 |
| 2 | 2 | 1 | 1 | 0 | 1 |
| 3 | 4 | 2 | 2 | 1 | 1 |
| 4 | 8 | 4 | 4 | 3 | 1 |
| 5 | 16 | 8 | 8 | 4 | 4 |
| 6 | 32 | 16 | 1 | 0 | 1 |

LRU LIST
PRE-COUNT VECTORS

*FIG. 5*

DATA TYPE T1

DataType T1 Subcache Size

MINIMUM COUNTERS
Global Subcache Size

|    | 0  | 1  | 2  | 4  | 8  | 16 | 32 | 64 |
|----|----|----|----|----|----|----|----|----|
| 0  | 0  | 14 | 14 | 20 |(12)| 0  | 0  | 38 |
| 1  | 12 | 6  | 22 | 20 |(0) | 0  | 0  | 38 |
| 2  | 4  | 12 | 20 | 12 |(0) | 0  | 0  | 38 |
| 4  | 10 | 14 | 8  |(12)| 0  | 0  | 0  | 38 |
| 8  | 12 |(10)| 12 | 0  | 0  | 0  | 0  | 38 |
| 16 |(8) | 14 | 0  | 0  | 0  | 0  | 0  | 38 |
| 32 | 14 | 0  | 0  | 0  | 0  | 0  | 0  | 38 |
| 64 | 38 | 0  | 0  | 0  | 0  | 0  | 0  | 0  |

Set T1CMIN of r * c counters

DATA TYPE T2

DataType T2 Subcache Size

Global Subcache Size

|    | 0  | 1  | 2  | 4  | 8  | 16 | 32 | 64 |
|----|----|----|----|----|----|----|----|----|
| 0  | 0  | 34 | 27 | 17 | 9  | 3  | 0  | 12 |
| 1  | 18 | 32 | 19 | 13 | 6  | 2  | 0  | 12 |
| 2  | 21 | 25 | 13 | 10 | 3  | 0  | 0  | 12 |
| 4  | 19 | 18 | 10 | 4  | 0  | 0  | 0  | 12 |
| 8  | 16 | 13 | 2  | 1  | 0  | 0  | 0  | 12 |
| 16 | 12 | 4  | 0  | 0  | 0  | 0  | 0  | 12 |
| 32 | 4  | 0  | 0  | 0  | 0  | 0  | 0  | 12 |
| 64 | 12 | 0  | 0  | 0  | 0  | 0  | 0  | 0  |

Set T2CMIN of r * c counters

DataType T1 Subcache Size

MAXIMUM COUNTERS
Global Subcache Size

|    | 0  | 1  | 2  | 4  | 8  | 16 | 32 | 64 |
|----|----|----|----|----|----|----|----|----|
| 0  | 0  | 12 | 10 | 13 | 12 |(7) | 6  | 38 |
| 1  | 12 | 6  | 16 | 14 |(6) | 6  | 0  | 38 |
| 2  | 4  | 8  | 16 | 8  |(12)| 0  | 0  | 38 |
| 4  | 10 | 12 | 6  | 16 |(0) | 0  | 0  | 38 |
| 8  | 12 | 8  | 14 |(0) | 0  | 0  | 0  | 38 |
| 16 |(8) | 14 | 0  | 0  | 0  | 0  | 0  | 38 |
| 32 | 14 | 0  | 0  | 0  | 0  | 0  | 0  | 38 |
| 64 | 38 | 0  | 0  | 0  | 0  | 0  | 0  | 0  |

Set T1CMAX of r * c counters

DataType T2 Subcache Size

Global Subcache Size

|    | 0  | 1  | 2  | 4  | 8  | 16 | 32 | 64 |
|----|----|----|----|----|----|----|----|----|
| 0  | 0  | 27 | 21 | 20 | 12 | 5  | 5  | 12 |
| 1  | 18 | 21 | 23 | 12 | 10 | 5  | 1  | 12 |
| 2  | 21 | 14 | 29 | 9  | 7  | 2  | 0  | 12 |
| 4  | 19 | 10 | 8  | 10 | 4  | 0  | 0  | 12 |
| 8  | 16 | 5  | 5  | 4  | 2  | 0  | 0  | 12 |
| 16 | 12 | 1  | 1  | 1  | 1  | 0  | 0  | 12 |
| 32 | 4  | 0  | 0  | 0  | 0  | 0  | 0  | 12 |
| 64 | 12 | 0  | 0  | 0  | 0  | 0  | 0  | 0  |

Set T2CMAX of r * c counters

SELECTING A SUBSET OF MINIMUM COUNTERS
AND SELECTING A SUBSET OF MAXIMUM COUNTERS
FOR DataType T1

*FIG. 6*

LRU List

| IN<br>Item Name | IDT<br>Item DataType | GN<br>Group Number g |
|---|---|---|
| 26 | T1 | 1 |
| 38 | T1 | 2 |
| 14 | T2 | 3 |
| 97 | T2 | 3 |
| 18 | T1 | 4 |
| 32 | T2 | 4 |
| 46 | T1 | 4 |
| 88 | T1 | 4 |
| 71 | T1 | 5 |
| 19 | T2 | 5 |
| 22 | T1 | 5 |
| 36 | T2 | 5 |
| 90 | T2 | 5 |
| 83 | T2 | 5 |
| 25 | T1 | 5 |
| 75 | T1 | 5 |
| 43 | T2 | 6 |

Pre-Count Vectors

| GN<br>Group Number g | SS<br>Subcache Size | MNI<br>Maximum Number of Items in group g | CNI<br>Current Number of Items in group g | T1<br>Number of Items with DataType T1 in group g | T2<br>Number of Items with DataType T2 in group g |
|---|---|---|---|---|---|
| 0 | 0 | 0 | 0 | 0 | 0 |
| 1 | 1 | 1 | 1 | 1 | 0 |
| 2 | 2 | 1 | 1 | 1 | 0 |
| 3 | 4 | 2 | 2 | 0 | 2 |
| 4 | 8 | 4 | 4 | 3 | 1 |
| 5 | 16 | 8 | 8 | 4 | 4 |
| 6 | 32 | 16 | 1 | 0 | 1 |

UPDATED LRU LIST
UPDATED PRE-COUNT VECTORS

*FIG. 7*

DATA TYPE T1

MINIMUM MISS VALUES

DataType T1 Subcache Size (columns) / Global Subcache Size (rows)

| Global Subcache Size | 0 | 1 | 2 | 4 | 8 | 16 | 32 | 64 |
|---|---|---|---|---|---|---|---|---|
| 0 | 98 | 84 | 70 | 50 | 38 | 38 | 38 | 0 |
| 1 | 86 | 80 | 58 | 38 | 38 | 38 | 38 | 0 |
| 2 | 82 | 70 | 50 | 38 | 38 | 38 | 38 | 0 |
| 4 | 72 | 58 | 50 | 38 | 38 | 38 | 38 | 0 |
| 8 | 60 | 50 | 38 | 38 | 38 | 38 | 38 | 0 |
| 16 | 52 | 38 | 38 | 38 | 38 | 38 | 38 | 0 |
| 32 | 38 | 38 | 38 | 38 | 38 | 38 | 38 | 0 |
| 64 | 0 | 0 | 0 | 0 | 0 | 0 | 0 | 0 |

Set T1MMIN of r * c Miss Values

DATA TYPE T2

DataType T2 Subcache Size (columns) / Global Subcache Size (rows)

| Global Subcache Size | 0 | 1 | 2 | 4 | 8 | 16 | 32 | 64 |
|---|---|---|---|---|---|---|---|---|
| 0 | 102 | 68 | 41 | 24 | 15 | 12 | 12 | 0 |
| 1 | 84 | 42 | 33 | 20 | 14 | 12 | 12 | 0 |
| 2 | 63 | 38 | 25 | 15 | 12 | 12 | 12 | 0 |
| 4 | 44 | 26 | 16 | 12 | 12 | 12 | 12 | 0 |
| 8 | 28 | 15 | 13 | 12 | 12 | 12 | 12 | 0 |
| 16 | 16 | 12 | 12 | 12 | 12 | 12 | 12 | 0 |
| 32 | 12 | 12 | 12 | 12 | 12 | 12 | 12 | 0 |
| 64 | 0 | 0 | 0 | 0 | 0 | 0 | 0 | 0 |

Set T2MMIN of r * c Miss Values

MAXIMUM MISS VALUES

DataType T1 Subcache Size (columns) / Global Subcache Size (rows)

| Global Subcache Size | 0 | 1 | 2 | 4 | 8 | 16 | 32 | 64 |
|---|---|---|---|---|---|---|---|---|
| 0 | 98 | 86 | 76 | 63 | 51 | 44 | 38 | 0 |
| 1 | 86 | 80 | 64 | 50 | 44 | 38 | 38 | 0 |
| 2 | 82 | 74 | 58 | 50 | 38 | 38 | 38 | 0 |
| 4 | 72 | 60 | 54 | 38 | 38 | 38 | 38 | 0 |
| 8 | 60 | 52 | 38 | 38 | 38 | 38 | 38 | 0 |
| 16 | 52 | 38 | 38 | 38 | 38 | 38 | 38 | 0 |
| 32 | 38 | 38 | 38 | 38 | 38 | 38 | 38 | 0 |
| 64 | 0 | 0 | 0 | 0 | 0 | 0 | 0 | 0 |

Set T1MMAX of r * c Miss Values

DataType T2 Subcache Size (columns) / Global Subcache Size (rows)

| Global Subcache Size | 0 | 1 | 2 | 4 | 8 | 16 | 32 | 64 |
|---|---|---|---|---|---|---|---|---|
| 0 | 102 | 75 | 54 | 34 | 22 | 17 | 12 | 0 |
| 1 | 84 | 63 | 40 | 28 | 18 | 13 | 12 | 0 |
| 2 | 63 | 49 | 30 | 21 | 14 | 12 | 12 | 0 |
| 4 | 44 | 34 | 26 | 16 | 12 | 12 | 12 | 0 |
| 8 | 28 | 23 | 18 | 14 | 12 | 12 | 12 | 0 |
| 16 | 16 | 15 | 14 | 13 | 12 | 12 | 12 | 0 |
| 32 | 12 | 12 | 12 | 12 | 12 | 12 | 12 | 0 |
| 64 | 0 | 0 | 0 | 0 | 0 | 0 | 0 | 0 |

Set T2MMAX of r * c Miss Values (2 * k) SETS OF MISS VALUES.
TWO SETS OF MISS VALUES FOR EACH DataType,
ONE FOR MINIMUM MISS VALUES, ONE FOR MAXIMUM MISS VALUES.

*FIG. 8*

DATA TYPE T1

DataType T1 Subcache Size (columns); APPROXIMATE MISS VALUES, Global Subcache Size (rows)

| | 0 | 1 | 2 | 4 | 8 | 16 | 32 | 64 |
|---|---|---|---|---|---|---|---|---|
| 0 | 98.0 | 85.5 | 74.5 | 59.8 | 47.8 | 42.5 | 38.0 | 0.0 |
| 1 | 86.0 | 80.0 | 62.5 | 47.0 | 42.5 | 38.0 | 38.0 | 0.0 |
| 2 | 82.0 | 73.0 | 56.0 | 47.0 | 38.0 | 38.0 | 38.0 | 0.0 |
| 4 | 72.0 | 59.5 | 53.0 | 38.0 | 38.0 | 38.0 | 38.0 | 0.0 |
| 8 | 60.0 | 51.5 | 38.0 | 38.0 | 38.0 | 38.0 | 38.0 | 0.0 |
| 16 | 52.0 | 38.0 | 38.0 | 38.0 | 38.0 | 38.0 | 38.0 | 0.0 |
| 32 | 38.0 | 38.0 | 38.0 | 38.0 | 38.0 | 38.0 | 38.0 | 0.0 |
| 64 | 0.0 | 0.0 | 0.0 | 0.0 | 0.0 | 0.0 | 0.0 | 0.0 |

Set T1AMM of r * c Miss Values

---

DATA TYPE T2

DataType T2 Subcache Size (columns); APPROXIMATE MISS VALUES, Global Subcache Size (rows)

| | 0 | 1 | 2 | 4 | 8 | 16 | 32 | 64 |
|---|---|---|---|---|---|---|---|---|
| 0 | 102.0 | 73.3 | 50.8 | 31.5 | 20.3 | 15.8 | 12.0 | 0.0 |
| 1 | 84.0 | 57.8 | 38.3 | 26.0 | 17.0 | 12.8 | 12.0 | 0.0 |
| 2 | 63.0 | 46.3 | 28.8 | 19.5 | 13.5 | 12.0 | 12.0 | 0.0 |
| 4 | 44.0 | 32.0 | 23.5 | 15.0 | 12.0 | 12.0 | 12.0 | 0.0 |
| 8 | 28.0 | 21.0 | 16.8 | 13.5 | 12.0 | 12.0 | 12.0 | 0.0 |
| 16 | 16.0 | 14.3 | 13.5 | 12.8 | 12.0 | 12.0 | 12.0 | 0.0 |
| 32 | 12.0 | 12.0 | 12.0 | 12.0 | 12.0 | 12.0 | 12.0 | 0.0 |
| 64 | 0.0 | 0.0 | 0.0 | 0.0 | 0.0 | 0.0 | 0.0 | 0.0 |

Set T2AMM r * c Miss Values k SETS OF APPROXIMATE MISS VALUES

*FIG. 9*

| g | r1 | r2 | GS | T1S | T2S | T1AMM[g,r1] | | T2AMM[g,r2] | | Estimated Misses | |
|---|---|---|---|---|---|---|---|---|---|---|---|
| 0 | 0 | 4 | 0 | 0 | 8 | 98.0 | + | 20.3 | = | 118.3 | |
| 0 | 3 | 3 | 0 | 4 | 4 | 59.8 | + | 31.5 | = | 91.3 | ← V[0] |
| 0 | 4 | 0 | 0 | 8 | 0 | 47.8 | + | 102.0 | = | 149.8 | |
| 1 | 2 | 3 | 1 | 2 | 4 | 62.5 | + | 26.0 | = | 88.5 | |
| 1 | 3 | 2 | 1 | 4 | 2 | 47.0 | + | 38.3 | = | 85.3 | ← V[1] |
| 2 | 2 | 3 | 2 | 2 | 4 | 56.0 | + | 19.5 | = | 75.5 | ← V[2] |
| 2 | 3 | 2 | 2 | 4 | 2 | 47.0 | + | 28.8 | = | 75.8 | |
| 3 | 0 | 3 | 4 | 0 | 4 | 72.0 | + | 15.0 | = | 87.0 | |
| 3 | 2 | 2 | 4 | 2 | 2 | 53.0 | + | 23.5 | = | 76.5 | ← V[3] |
| 3 | 3 | 0 | 4 | 4 | 0 | 38.0 | + | 44.0 | = | 82.0 | |
| 4 | 0 | 0 | 8 | 0 | 0 | 60.0 | + | 28.0 | = | 88.0 | ← V[4] |

V[0]=91.3 S[0]=3,3
V[1]=85.3 S[1]=3,2
V[2]=75.5 S[2]=2,3
V[3]=76.5 S[3]=2,2
V[4]=88.0 S[4]=0,0

FINDING THE BEST SUBCACHE SIZES

DYNAMIC SUBCACHE SPACE ALLOCATION

METHOD AND MEANS FOR DYNAMICALLY PARTITIONING CACHE INTO A GLOBAL AND DATA TYPE SUBCACHE HIERARCHY FROM A REAL TIME REFERENCE TRACE

CROSS REFERENCES TO RELATED APPLICATIONS

This application is related to copending application of Richard L. Mattson, U.S. Ser. No. 07/703,309, filed May 20, 1990, entitled "Partitioned Cache for Cache Memory Management" still pending, the latter being a continuation of application U.S. Ser. No. 07/327,204, filed Mar. 22, 1989, now abandoned.

FIELD OF THE INVENTION

This invention relates to a hierarchy of least recently used (LRU) disciplined caches formed from a global subcache and a plurality of single data type sub caches. More particularly, this invention relates to dynamically ascertaining the subcache partition sizes from the hit and miss ratios of a real time trace of references made to the cache hierarchy and then adjusting the partitions to reflect expected improved performance.

DESCRIPTION OF RELATED ART

In the prior art, it is known that it is sometimes better to separate different data types into different caches and manage these caches independently. Thus, instruction caches are separated from data caches in processors and several different buffers or buffer pools in database systems, with each buffer pool of a different size and holding different data types. The number of separate caches, the size of each cache, and the data types that go into each cache has been a static choice made once at system initialization time. If the factors that influenced the decision change, the system must be re-started with new parameters.

For purposes of this invention, a "hit ratio" is the number of successful references made to the cache hierarchy to the total number of references in any trace of arbitrary length. Likewise, a "miss ratio" is the number of unsuccessful references to the total number of references in the trace.

The Mattson Patient—Dynamic Adjustment

It is was also known from Mattson et al, U.S. Pat. No. 4,463,424, issued Jul. 31, 1984 that the portions of an LRU-referencable cache shared among concurrently executing sequential processes could be dynamically adjusted to a real time trance of read/write references. In such systems, a supervisory process was invoked to manage the cache referencing. Mattson's method included the steps of (a) determining an optimal partition space allocation among the processes and (b) reallocating the actual partitions among the concurrent processes.

In the Mattson '424 patent, the step of determining an optimal space allocation comprised (1) accumulating a trace of consecutive references to items stored in the LRU cache; (2) partitioning the space over a range of predetermined cache sizes; (3) ascertaining the hit and miss ratios from the accumulated trace as a function of the LRU cache partition sizes; and (4) responsive to each trace reference, LRU ordering the items in the partitioned space and adjusting for overflow among the partitions. Finally, Mattson's method reallocated the partitions among the concurrent processes according to and in overlapped relation with the determination step by the supervisory process. It is also the case that the Mattson patent provided a separate LRU list and an available cache space list for each process.

The Co-pending Mattson Application

The above identified copending Mattson '309 application is operative in a global to local LRU cache destaging direction among referenced objects (i.e. tracks, blocks, records, pages etc.) defined over a plurality of data types. That is, each object is classified according to one of a set of types. Now the cache itself is a unitary physical structure typically formed from random access memory (RAM) and positioned in the path to data between external storage and internal memory portion of one or more accessing CPU's. However, the physical cache is logically partitioned to form an LRU global cache and a plurality of LRU destaging local caches. Significantly, the global cache stores and LRU orders objects of all types while each local cache is bound to objects having a unique data type.

All references are made to the global cache and data is staged to the global cache either from one of the local caches or from external storage. When the cache full condition is reached, the placement of the most recently used (MRU) data element to the top of the global cache results in the LRU data element of type T(i) cache being destaged to the local cache storing type T(i) data. Likewise, when the cache full condition is reached in the local caches, they in turn will destage their LRU data elements to external storage.

The copending '309 application describes a cache hierarchy having a fixed total storage capacity which is partitioned among the sub- caches both global and local. The parameters defining the partitions are provided external to the method and means disclosed therein. It further sets forth the method and means whereby the partitions may be adjusted and readjusted. Significantly, the '309 application does not ascertain the parameters nor by itself enforce the optimal size allocation among the sub caches.

SUMMARY OF THE INVENTION

It is an object of this invention to devise a method and means for dynamically allocating space in a partitionable cache from a real time reference trace.

It is a related object that the method and means be operable on a partitionable cache located in the path to data between a CPU and an external storage subsystem.

It is a related object that such method and means be executable on a partitionable cache of the Mattson type. That is, a partitionable cache formed by an LRU hierarchy of a global cache storing data of heterogeneous type and a plurality of local or single caches storing data of a corresponding single type, data being LRU destagable in the cache full condition in the global to local to external storage direction.

It is yet another object that such method and means operate to minimize both CPU computation and storage resources.

The above objects are satisfied by a method and means which (a) creates and maintains an LRU list of cache referenced objects, (b) creates and maintains a multi-planar array data structure dynamically approximating a range of subcache partitions sizes, and (c) uses a heuristic for optimizing one or more partition distributions over the set of sub caches. The array is formed from counting the hits and misses of a real time reference trace according to a graduated index of cache sizes which approximate the minimum and maximum sizes of the global and each one of the data type sub caches. Each hit represents an approximate position of the reference in an LRU list as measured from the most recently referenced (MRU) position in that list and whence represents an approximate cache size.

More particularly, the method and means include the steps of (a) recursively creating and maintaining LRU lists of referenced objects located in the counterpart caches; (b) recursively creating and maintaining a multiplanar array of cache partition distribution data obtained from said reference trace and said lists, said each plane in the array having at least the integer dimensions of global cache size, local cache size, and data type; and (c) optimally resizing the global and local cache partitions after a predetermined number of cycles in any current reference trace according to a deterministic dynamic program over said array.

In the method and means of this invention, for any given plane in the array indexed by data type, each array element represents additional hits that would be obtained if either the global cache partition were increased by a first increment or the local cache partition were increased by another increment over the cache partition sizes associated with any left and top array elements adjacent any given element.

Counting Arrays and Data Structures

Significantly as expressed above, step (b) involves use of counters and the creation and maintenance of a data structure (the array) that primarily assists in determining the size that a cache or subcache would have to have been in order for a cache reference to have been a hit. While, obtaining an exact cache size value is computationally intensive, it is feasible to bound such a cache size between an upper and lower or maximum (MAX) and minimum (MIN) values. That is, the true value lies within a range defined between MAX and MIN.

In one embodiment, the determination of these values is assisted by the use of 2 pairs of counters per cache for each data type cache counting cache hits. One counter pair defining row and column entries for the MINIMUM cache sizes and the other counterpart defining such entries for the MAXIMUM cache sizes. Relatedly, each array dimension is indexed according to increasing discrete cache size values (i.e. 0,1,2,4,8,16 . . . ) for the global and single data type sub caches respectively. Such size values are co-extensive with "group" numbers used in LRU lists and in another data structure termed a "pre-count vector" or PCV.

This array of counters and related structures track two events simultaneously. These are (1) the size range that the global cache should exhibit that would ensure that any given reference would be a "hit" for a heterogenously and randomly ordered reference string of data types defined onto a global cache, and (2) the size range (min. and max.) that a single data type cache should exhibit that would ensure that any given reference of the appropriate data type would be a "hit" for a heterogenously and randomly ordered reference string of data types defined onto a cache responsive to a given single data type.

This is resolved by use of an array where any given array "hit" count is counterpart to a global cache size as a row index and a single data type (data type) subcache size as a column index.

Deterministic Dynamic Programming

Lastly as expressed above, step (c) includes the use of a deterministic dynamic program operating on the array data by which a partition size distribution is obtained. Various partition size distributions over which hit ratios might be optimized could also be obtained by exhaustive enumeration. However, exhaustive enumeration is a combinatorially expanding activity depleting the fastest and largest processors. In this regard, it was found that dynamic programming was an appropriate procedure less computationally intensive than enumeration. That is, this step recognized that finding and fitting the appropriate partition sizes among the subcaches could be resolved as a type of discrete or continuous multistep recursive optimization problem.

More particularly, deterministic dynamic programming includes finding a recursive optimal solution to an n-step dynamic process over parameter sets of discrete values as opposed to sets lying in continuous valued domains. The optimal solution of the $(n-1)$- step process commences with the optimal outcome of the first step.

Dynamic programming is described for example in Bellman and Dreyfys, "Applied Dynamic Programming", copyright 1962 by Princeton University Press and Hiller et al, "Introduction to Operations Research", copyright 1967, 1990 by McGraw-Hill Inc. at pages 393–433.

A Programmatic Summary of the Method and Means of the Invention

Programmatically, the method and means of this invention may be expressed as including the steps of:

(1) classifying storage data into k categories (data types) using a pre-specified scheme of classification.

(2) partitioning the cache into a global subcache and k other sub caches to hold the k differing data types and allocating cache space to the subcaches.

(3) initializing to zero all counters contained in 2*k disjoint sets, k sets of counters to hold minimum counts, and another sets of counters to hold maximum counts.

(4) initializing a list (and an associated data structure) to hold cache requests in a "Least Recently Used" (LRU) order, with the most recently issued request at the top of the LRU list and the least recently issued request at the bottom of the LRU list.

(5) In response to each request in a sequence of N requests to the cache (a) a hit or miss to the partitioned cache is recorded and, if necessary, the subcache contents are changed to contain the most recently referenced items by fetching the requested item into the global subcache and removing least recently referenced items from appropriate sub caches.

(b) Using the data type of the currently requested item and the current state of the LRU list (and associated data structure), a value of 1 is added to each counter in a subset of the counters contained in one of the k disjoint sets of counters used to store minimum counts, and a value of 1 is added to each counter in a subset of the counters contained in one of the k disjoint sets of counters used to store maximum counts.

(c) The LRU list and an associated data structure are updated to reflect the current cache request.

(6) At the conclusion of N requests to the cache:

(a) forming 2*k disjoint sets of miss values, each value based on data obtained from the 2*k disjoint sets of counters.

(b) Using the 2*k sets of miss values, to determine an allocation of cache space to subcaches which would tend to minimized the number of misses to the cache for the N previous requests.

(c) Allocating cache space to the subcaches in the partitioned cache according to the values obtained step 6b above.

(d) Setting cache miss counters in the 2*k disjoint sets of counters to zero.

(7) Repeating steps 5 and 6 above with possibly a different value of N.

Note, step 6(b) above would be the point of invocation of a deterministic dynamic program. The particular instance is set forth in the description of the preferred embodiment.

The relations between the broader and programmatic summaries of the invention are as follows:

| Broad Summary | Programmatic Summary |
|---|---|
| Step (a) | Steps (1)-(3) |
| Step (b) | Steps (4)-(5) |
| Step (c) | Steps (6)-(7) |

BRIEF DESCRIPTION OF THE DRAWING

FIG. 4 sets forth matrices for holding minimum and maximum count values for 2 data types.

FIG. 5 illustrates the structure of the LRU list and the Pre-Count-Vectors.

FIG. 6 enumerates the subset of counters that become incremented upon a reference request being made to the cache.

FIG. 7 shows the structure of the LRU list and the Pre-Count-Vectors after accounting for the currently requested item.

FIG. 8 depicts the construction of the sets of miss values.

FIG. 9 sets forth the construction of the sets of approximate miss values.

DESCRIPTION OF THE PREFERRED EMBODIMENT

Incorporation by Reference

The co-pending application of Mattson, U.S. Ser. No. 07/703,309, filed May 20, 1990 is hereby incorporated by reference including but not limited to the description of cache management, the mechanics of LRU list management, and effectuating changes in partition sizes among the global and single data type subcaches.

System with Multiple Caches

Figure 1:
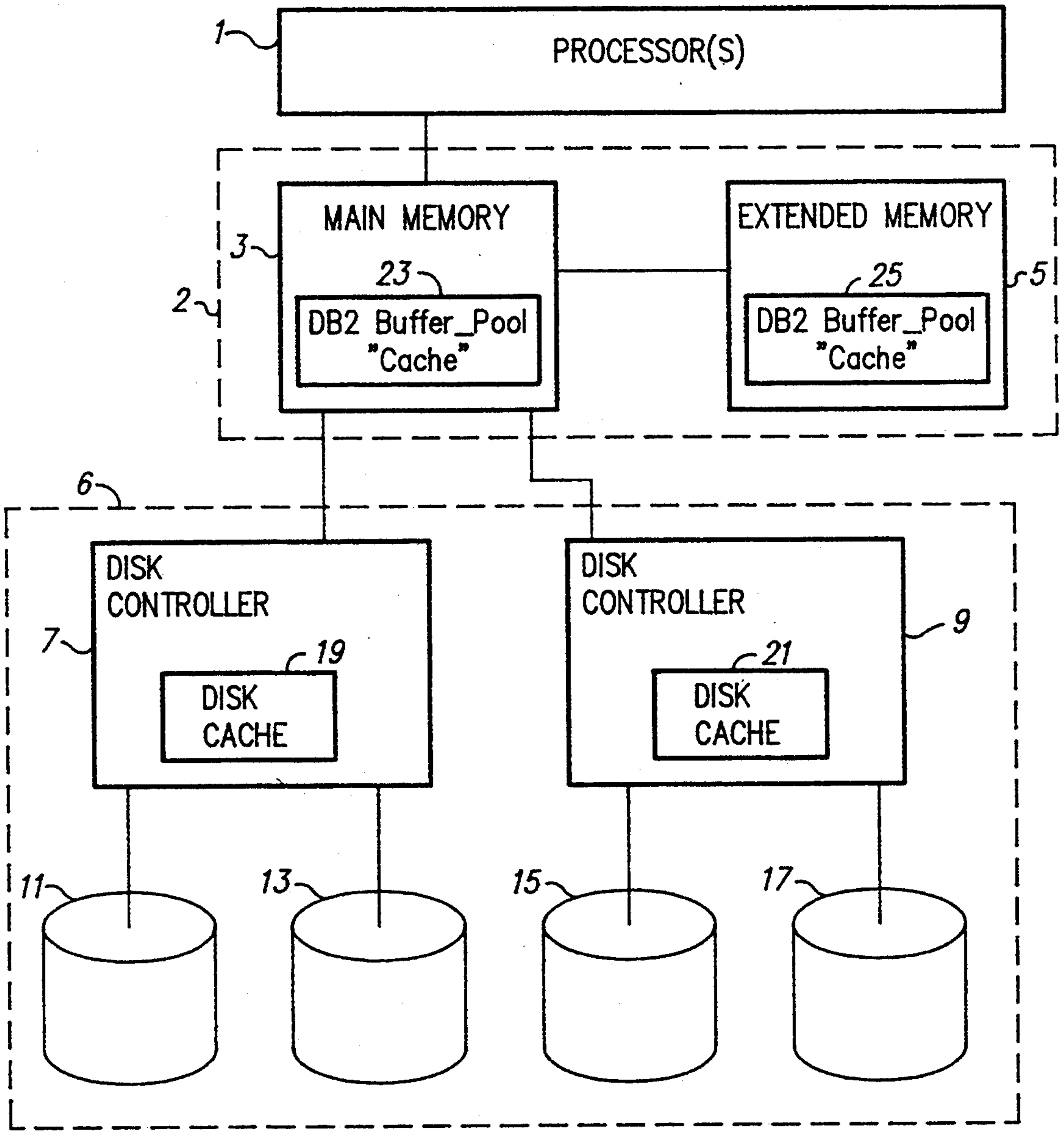
FIG. 1 illustrates a processor, extended memory, a control system, and a disk storage system, including some of its various buffer or cache memories.
Figure 2:
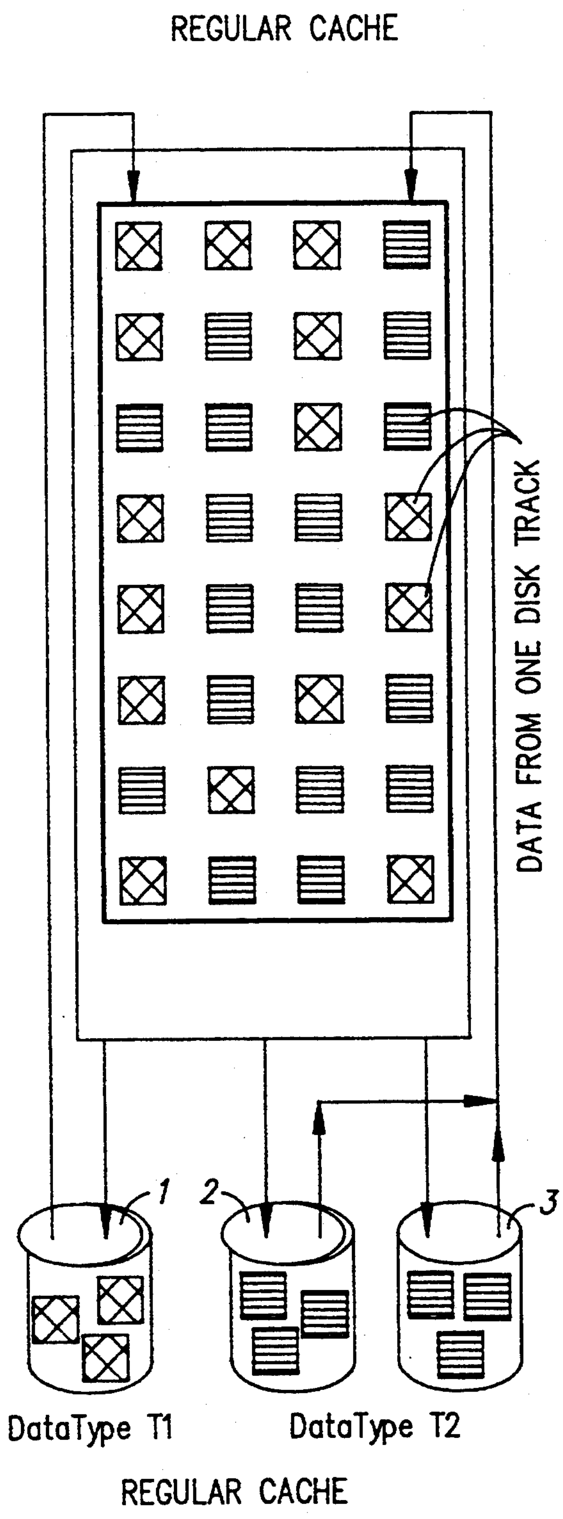
FIG. 2 shows a conventional unitary cache.

Referring now to FIG. 1, there is shown the logical relation among a processor, its internal memory, and external storage. In this regard, processor 1 communicates with a direct access storage device (DASD) external storage subsystem 6 over a path including internal memory 2. Each of the elements of internal memory such as main memory 3 and extended memory 5 are random access, the first being byte addressable while the latter being page addressable.

The path to data stored on the DASDs 11, 13, 15, and 17 of subsystem 6 may be established from internal memory 2 and a counterpart disk or DASD controller 7 or 9. Significantly, it is well known that a cache placed at different levels can enhance local performance. That is, DASD or disk caches 19 and 21 within controllers 7 and 9, as well as caches 23 and 25 within main and extended memories 3 and 5 provide an LRU ordered repository of objects created therein or staged from the DASDs. An object available in cache reduces the access time. The LRU ordering relies on the principle of locality of referencing and is elsewhere discussed at length in the literature.

Aspects of the Counting Arrays and Data Structures

This is resolved by use of an array where any given array "hit" count is counterpart to a global cache size as a row index and its corresponding local cache (single data type) subcache size as a column index. Relatedly, the global and data type cache sizes may determined as follows:

Recall that any LRU cache manager maintains an LRU ordered list of the cache contents as follows:

| No. | Name | Comment |
|---|---|---|
| 1 | MRU | |
| 2 | | |
| 3 | X | defines the size of a cache exactly as a function of position from the top of the LRU list |
| 4 | | |
| 5 | | |
| 6 | LRU | |

In the above list, a reference to item X would be a "hit" if the cache were 3 or more units of cache size and a "miss" if it was any size less than 3. This exact determination of cache size was expressed in Mattson et al, "Evaluation Techniques for Storage Hierarchies", IBM Systems Journal, Vol. 9, No. 2, 1970, pp. 78-117.

Suppose LRU lists were maintained for the GLOBAL and each data type cache.

| No. | Global Cache | Data type T1 Cache | Comments |
|---|---|---|---|
| 1 | MRU | MRU2 | |
| 2 | | | |
| 3 | | X | Entry in type T1 cache differs from global entry |
| 4 | | | |
| 5 | | | |
| 6 | X | LRU | Entry in global differs from type T1 entry |
| 7 | | | |
| 8 | LRU | | |

Thus, for the data construct of an array of hit counts dimensionally indexed according to graduated cache sizes for the global and data type caches, then the hit entry would be incremented at array row column coordinates (6,3) and (5,1) etc. That is, each hit results in a series of counters taking global and local cache sizes into account. In this case, a global subcache of size 6 or more would ensure a hit while a local cache of size 1 would be sufficient. In contrast, a global subcache of size 5, would still permit the local subcache of size 1. The prospect under the method and means of this invention is that of ascertaining k*G coordinates where k is the number of data types and G is the number of global subcache sizes. This would reflect the exact required sizes of the respective global and single data type caches.

One problem resulting from an exact dynamic determination of the sizes of caches by use of large magnitude LRU lists is that a hierarchical system of k caches would require k*LRU lists where k=30 . . . 40. To maintain such lists continually in RAM occupies significant internal storage affecting application execution and other OS activities. This means that each cache entry appears twice, once in the global LRU list and once in the counterpart single data type LRU list.

One resolution of multiple LRU lists would be to add another coordinate to the LRU list, namely, that of a data type identity for each entry.

Given a LRU list modify with an entry for data Type:

| No. | Name | Data Type | Group No. i.e. caches of certain sizes | Running Total of T1 Entries in Above Groups |
|---|---|---|---|---|
| 1 | MRU | | 0 = 20 | 0 |
| 2 | x8 | T1 | I = 21 | 0 |
| 3 | y7 | T2 | I | |
| 4 | x1 | T1 | II = 22 | 1 |
| 5 | y8 | T1 | II | |
| 6 | x7 | T1 | II | |
| 7 | x5 | T1 | II | |
| 8 | y3 | T2 | III = 23 | 5 |
| 9 | y19 | T2 | III | |
| 10 | Y | T1 | III | |
| 11 | | | III | |
| 12 | X2 | T1 | III | |
| 13 | | | III | |
| 14 | | | III | |
| 15 | | | III | |
| 16 | | | IV = 24 | 7 |
| 17 | | | IV | |
| 18 | | | IV | |
| 19 | LRU | *** | ******* | ******** |

The entries in this LRU list are grouped. This means that there is an interest in only caches of certain sizes such as increasing powers of two i.e. 20,21,22,23 . . . The list then becomes banded.

It would be possible to construct an LRU list for each global subcache size and each data type T1 by copying the global entries and then just the T1 entries. For very large lists (hundreds of thousands of entries), this becomes infeasible considering the number of counts and copying etc. This leads to the use of the previously mentioned precount vector construct. Note there is an entry at each of the group boundaries or at the entry of the counterpart data type. The exact location of a T1 reference in a group is not known but there is known how many T1 entries there are in the groups above it. Hence an ordering within the data type LRU cache is provided. Alternatively, in order to minimize the number of changes when managing LRU cache overflow each entry might use the number of entries of a data type in that group.

Implementation of the Programmatic Steps

Step 1 in the Method of this Invention

Figure 3:
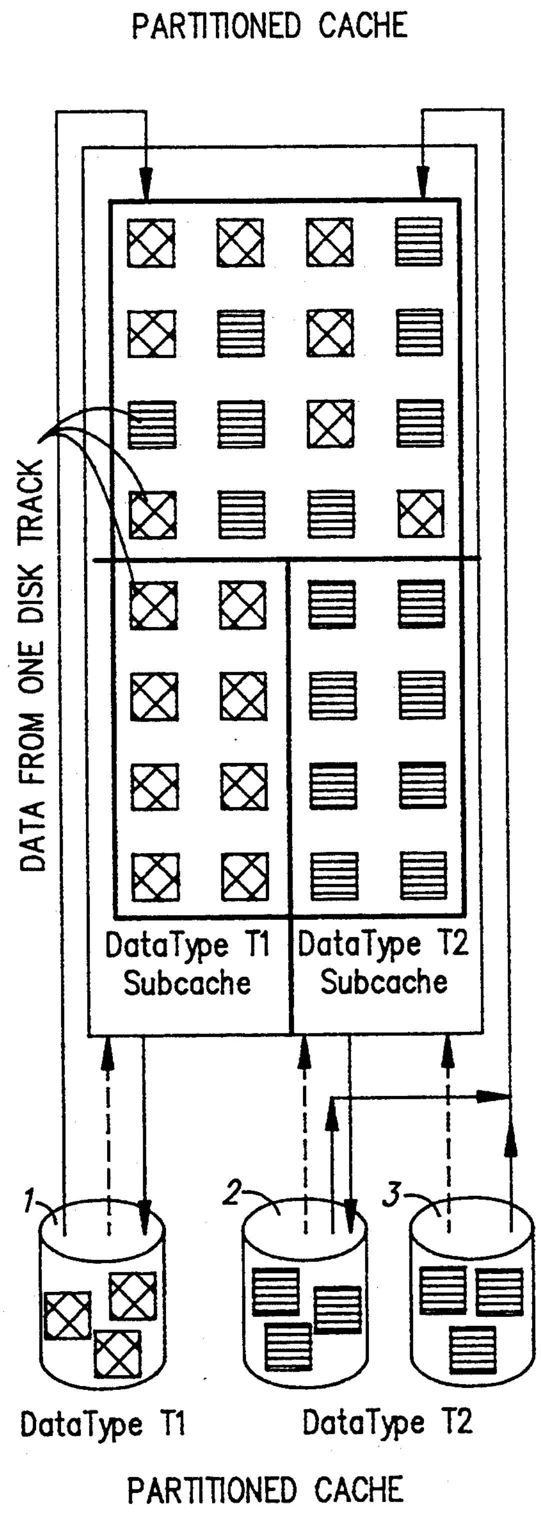
FIG. 3 depicts a partitioned cache with a global subcache and two subcaches for two different data types.

Step 1 in the method of this invention requires classifying data into k data types using a pre-specified scheme of classification. Data being placed in a partitioned cache can belong to different types because of physical placement, like data on one disk volume versus data on another disk volume, or it can belong to different types because of its logical placement, like data in one type of file, table, or data set versus data in another type of file, table, or data set, or it can belong to different types because of its current use, like data being read, prefetched, or written, or data being currently used as an index, or being accessed by system code or user code, or it can belong to different types because of specified combinations of the above. Two different types of data are illustrated in FIG. 3, where data residing on disk 1 belongs to one data type and data residing on disks 2 and/or disk 3 belongs to the other data type.

Step 2 in the Method of this Invention

Step 2 in the method of this invention requires partitioning the cache into a global subcache and k other subcaches to hold the k differing data types and allocating cache space to the subcaches. Whether the subcaches are physically separate or physically together and logically partitioned is immaterial. For the purpose of the following description of the preferred embodiment, the partitioned cache will be described in terms of a cache in which the access time and the cost of all the subcaches is the same. Nevertheless, the invention is also applicable when the time to access a subcache and/or the cost of the memory in the subcache may be different for different subcaches.

In a partitioned cache the global subcache accepts all data types while each of the other k subcaches accepts only one type of data. The preferred embodiment of the invention will be described in connection with disk track caching, in which data from a disk track is stored and managed together as a single unit, regardless of the number of records, pages, or blocks in that track. The techniques of the invention can also be used in connection with block caching and record caching.

In FIG. 3 a cache of size 32 tracks is partitioned into a Global subcache of size 16 tracks, a subcache for data type T1 of size 8 tracks, and a subcache for data type T2 of size 8 tracks.

Step 3 in the Method of this Invention

Step 3 in the method of this invention requires that 2*k disjoint sets of counters be set to zero. The preferred embodiment of the invention organizes the counters in each of the 2*k sets into a matrix of r rows and c columns where r is the number of different allowable global subcache sizes and c is the number different allowable data type subcache sizes. In this manner, two matrices of counter values are defined for each of the k data types, one matrix is used to record minimum count values and the other is used to record maximum count values. For data type Tx these matrices are called TxCMIN and TxCMAX respectively, and the count values for data type Tx, row r, column c are called TxCMIN[r,c] and TxCMAX[r,c] respectively. Whereas the preferred embodiment has all the matrices of the same size, the method of the invention can have differing sizes of matrices for differing values of k.

In FIG. 4 four (8 by 8) matrices of counter values are illustrated, a Minimum and a Maximum matrix for data of type T1 and a Minimum and a Maximum matrix for data of type T2. The rows and columns represent allowable subcache sizes, and each value in the matrix represents the current value of a counter. Step 3 initializes these counter values to zero, and FIG. 4 illustrates possible counter values after several cache requests have been made. Whereas in FIG. 4 the allowable subcache sizes for all sub caches are restricted to zero and powers of two, in practice the subcache sizes can be restricted to zero and any positive integer and the subcache sizes can be different for the rows and for the columns, and they can be different from one matrix to another so long as the minimum and maximum matrices for any given data type are of the same dimensions with the same subcache sizes for each row and each column.

Step 4 in the Method of this Invention

Step 4 in the method of this invention requires initializing a list to hold cache requests in a "Least Recently Used" (LRU) order, with the most recently requested item at the top of the LRU list and the least recently requested item at the bottom of the LRU list. The preferred embodiment of the invention organizes this list as illustrated in FIG. 5 where the rows in the LRU list contain three entries, "IN", the Item Name (a unique track, page, blocks, or record number), "IDT", the Item data type, and "GN", the item Group Number. Also shown in FIG. 5 are some Pre-Count-Vectors that must be associated with the LRU list in order for the method of the invention to work. Each Pre-Count-Vector contains 4+k entries, "GN", the row number or Group Number associated with that Pre-Count-Vector, "SS", a subcache Size associated with the corresponding Group Number, "MNI", the difference between this subcache Size and the next smaller subcache Size or equivalently the Maximum Number of Items in the LRU list that can have the indicated Group Number, "CNI", the Current Number of Items in the LRU list that have the indicated Group Number, and "T1", "T2", . . . , "Tk", each representing the number of items in the LRU list that have both the indicated Group Number and the data types T1, T2, . . . , or Tk, respectively. FIG. 5 illustrates an LRU list and its associated Pre-Count-Vector array with two data types, T1 and T2.

In the preferred embodiment the initial LRU list is empty and in the Pre-Count-Vectors the number of items in each group and the number of entries in the LRU list having a given group value and a given data type are all zero. FIG. 5 shows the LRU list and the Pre-Count-Vector array after some requests have been made to the cache. Note in FIG. 5 that the group number, g, given in the Pre-Count-Vectors corresponds to the row number of the Pre-Count-Vector array and also to the row number and/or column number of the matrices shown in FIG. 4 that have the same subcache size as given in the Pre-Count-Vector.

Steps 5a–5c in the Method of this Invention

Step 5a in the method of this invention requires that after each request in a sequence of requests a "hit" or a "miss" to the partitioned cache be recorded and the subcache contents be updated. In the preferred embodiment of the invention two counters, HC and MC (initially set to zero), are used to record hits and misses. A cache "hit" is recorded by adding one to the value of HC if a requested piece of data is found in any subcache of the cache. Conversely, if the requested data is not found in any subcache of the cache, a "miss" is recorded by adding one to the value of MC. The number of hits and/or misses are usually measured during a finite sequence of references called the "reference string" and a cache is said to be effective for that reference string if a low percentage of the references result in misses.

Referring to FIG. 3, when the requested item is not in the cache, it is brought from a disk at the bottom of the figure to the top level of the cache, the global subcache. If the global subcache is full, the LRU item in the global subcache is logically pushed from the global subcache to its appropriate subcache based on its data type thereby making room for the currently requested item in the global subcache. At the same time, if the subcache selected to receive the item pushed from the global subcache is full, then the LRU item in that subcache is logically pushed from the subcache making room for the item from the global subcache.

Additionally, if the requested data item is in the global subcache, then it is a hit to the cache and the subcache contents remain unchanged. If the requested data item is not in the global subcache, but is in one of the other sub caches, then it is still a hit to the cache, but now the requested item is logically moved from the data type subcache to the global subcache. Again, if the global subcache is full, the LRU item in the global subcache is logically pushed from the global subcache to its appropriate subcache based on its data type thereby making room for the currently requested item in the global subcache. If the pushed item is of the same data type as the requested item, then there will be room for it in the subcache. However, if the requested item and the pushed item are of different data types, then a hole or empty space is left in the subcache of the requested item data type and if the subcache selected to receive the item pushed from the global subcache is full, then the LRU item in the subcache is logically pushed from the subcache making room for the item from the global subcache. How subcache holes are filled or not filled affects the performance of the partitioned cache but does not alter the spirit of invention and certainly many different hole filling techniques are available to one skilled in the art.

In the preferred embodiment of the invention, the method of filling the holes is to prefetch the most recently requested item with the required data type that is not currently in the cache. Of course, the above method of updating the contents of the sub caches requires that an LRU list or equivalent be maintained for each of the sub caches and in the case of the data type subcaches the lists contain more entries than will fit in the subcaches so that pre-fetching can be properly done.

Step 5b in the method of this invention requires that after each request in a sequence of requests to the cache, a value of 1 be added to each counter that is selected from two pre-determined sets of counters. In the preferred embodiment of the invention the counter sets are arranged as a matrix as shown in FIG. 4. The data type of the currently requested item (as it is given in the LRU list) is used to determine which two matrices (sets of counter values) are to be examined. As illustrated in FIG. 4, one of these matrices can be called TxCMIN, the other TxCMAX. Row r column c will be denoted as TxCMIN[r,c] or TxCMAX[r,c] depending on which matrix is being considered. ALGORITHM-1 given below is then used to increment certain of these counter values by one. Also, the word "WHILE" in ALGORITHM-1 has the same meaning as in the ALGOL, or C programming languages.

ALGORITHM-1 Incrementing the Counter Values.

(1) If the currently requested item is not in the LRU list and is of data type Tx: then:

(a) Select Counter Matrices TxCMIN and TxCMAX under data type Tx.

(b) In each matrix add one to the counter value in the last row, first column and add one to the counter values in the last column and every row except the last row.

(c) Exit ALGORITHM-1.

else:

(a) Continue with ALGORITHM-1.

(2) Find the currently requested item in the LRU list, get its data type Tx and its group number g. (3) Select the Counter Matrices TxCMIN and TxCMAX under data type Tx. (4) Add one to Counter Values TxCMIN[g,O] and TxCMAX[g,O] in counter matrices for data type Tx.

(5) Set i=1, and j=PCV[g,Tx], m=0, and n=0.

(6) While g>0

(a) While (i>PCV[m,SS]) m=m+1 (find next column m in TxCMIN)

(b) While (j>PCV[n,SS]) n=n+1 (find next column nin TxCMAX)

(c) Set g=g−1. (set g=next row in TxCMIN and TxCMAX)

(d) Increment TxCMIN[g,m] and TxCMAX[g,n] by one.(Increment counters)

(e) Set i=i+PCV[g,Tx] and j=j+PCV[g,Tx].

As an example, if the data item named "26" is requested, then applying ALGORITHM-1 to the LRU list shown in FIG. 5 causes the counter values circled in FIG. 6 to be incremented by one.

Step 5c in the method of this invention requires that after each request it, a sequence of requests to the cache, the LRU list and an associated data structure are updated to reflect the current cache request. In the preferred embodiment of the invention the LRU list and its associated Pre-Count-Vectors are as illustrated in FIG. 5 and ALGORITHM-2 given below is applied to the LRU list and the Pre-Count-Vectors to perform the updating process.

ALGORITHM-2 Updating the LRU list and associated Pre-Count-Vectors (1) Remove the currently requested item from the LRU list if it is in the list. (2) Set g and Tx to the Group Number and the data type of the currently requested item. (3) Decrease PCV[g,CNI] and PCV 8 g,Tx] by one.

(4) Set the Group Number of the currently requested item to one and put the currently requested item at the top of the LRU list. (5) Increase PCV[l,CNI] and PCV[l,Tx] by one. (6) Set i=1. (7) While (PCV[i,CNI]>PCV[i,MNI])

(a) Locate the bottom most item in the LRU list with a Group Number equal i and set Tj to its data type, then change its Group Number to i+1.

(b) Decrease PCV[i,CNI] and PCV[i,Tj] by one.

(c) Increase PCV[i+1,CNI] and PCV[i+1,Tj] by one.

(d) i=i+1.

As an example, if the data item named "26" is requested, then applying ALGORITHM-2 to the LRU list and Pre-Count-Vectors shown in FIG. 5 results in the LRU list and Pre-Count-Vectors shown, in FIG. 7.

Steps 6a–6d in the Method of this Invention

Step 6a in the method of this invention requires that after N requests have been made to the cache 2*k disjoint sets of miss values be formed where each miss value is determined from one set of counter values realized from step 5b above. The preferred embodiment of the invention organizes the miss values in each of the 2*k sets into a matrix of r rows and c columns such as illustrated in FIG. 8 (for two data types) where in each matrix, the rows represent global subcache sizes and the columns represent data type subcache sizes of the same values as in the count matrices formed, in Steps 3 and 5b above and illustrated in FIGS. 4 and 6. Values in each Miss Matrix are formed from values in the corresponding Count Matrix by using the following equations:

| | | | | |
|---|---|---|---|---|
| TxMMIN[r,c] = | Cmax<br>SUM<br>i = c + 1 | TxCMIN[r,c] | for | 0 <= c < Cmax<br>0 <= r <= Rmax |
| TxMMAX[r,c] = | Cmax<br>SUM<br>i = c + 1 | TxCMAX[r,c] | for | 0 <= c < Cmax<br>0 <= r <= Rmax |
| TxMMIN[r,Cmax] = | 0 | | for | 0 <= r <= Rmax |
| TxMMAX[r,Cmax] = | 0 | | for | 0 <= r <= Rmax |

For each data type, Tx, a minimum Miss Matrix, called TxMMIN[r,c], and a maximum Miss Matrix, called TxMMAX[r,c], are formed from the corresponding Count Matrices TxCMIN[r,c] and TxCMAX[r,c] by the application of the above equations. FIG. 8 illustrates the Miss Matrices formed from the Count Matrices illustrated in FIG. 6 by the application of the above equations. From the Miss Matrices illustrated in FIG. 8:

(1) The number of misses to a partitioned cache of size 32, (such as illustrated in FIG. 3 with global subcache size of 16, data type-T1 subcache size of 8, and data type-T2 subcache size of 8) can be determined from the matrices illustrated in FIG. 8 by observing that T1MMIN[5,4]=38 and T2MMIN[5,4]=12, for a minimum number of misses=38+12=50, and T1MMAX[5,4]=38 and T2MMAX[5,4]=12, for a maximum number of misses=38+12=50. Thus, the number of misses would have been between 50 and 50 or exactly 50 misses;

(2) The number of misses to a partitioned cache of size 32 with Global subcache size of 0, data type-T1 subcache size of 16, and data type-T2 subcache size of 16 can be determined from FIG. 8 by observing that T1MMIN[0,5]=38 and T2MMIN[0,5]=12, for a minimum number of misses=38+12=50, and T1MMAX[0,5]=44 and T2MMAX[0,5]=17, for a maximum number of misses=44+17=61. Thus, the number of misses would have been between 50 and 61;

(3) The number of misses to a partitioned cache of size 7, with global subcache size of 4, data type-T1 subcache size of 2, and data type-T2 subcache size of 1 can be determined from FIG. 8 by observing that T1MMIN[3,2]=50 and T2MMIN[3,1]=26, for a minimum number of misses=50+26 =76, and T1MMAX[3,2]=54 and T2MMAX[3,1]=34, for a maximum number of misses=54+34 =88. Thus, the number of misses would have been between 76 and 88; and (4) The number of misses to a partitioned cache of size 0, with global subcache size of 0, data type-T1 subcache size of 0, and data type-T2 subcache size of 0 can be determined from FIG. 8 by observing that T1MMIN[0,0]=98 and T2MMIN[0,0]=102, for a minimum number of misses=98+102 =200, and T1MMAX[0,0]=98 and T2MMAX[0,0]=102, for a maximum number of misses=98+102=200. Thus, the number of misses would have been between 200 and 200 or exactly 200 misses.

Step 6b in the method of this invention requires that after N requests have been made to the cache, an allocation of cache space to sub caches be determined, based on the miss values obtained in Step 6a above, which would tend to minimized the number of misses to the cache for the previous N requests. In the preferred embodiment of the invention k sets of approximate miss values are realized in the form of k matrices. For each data type, Tx, an approximate Miss Matrix, called TxAMM[r,c] is formed as a linear combination of TxMMIN[r,c] and TxMMAX[r,c], e.g., the value TxAMM[r,c] is equal to (A*TxMMIN[r,c])+((1-A)*TxMMAX[r,c])) with (0<=A <=1). The set of k matrices TxAMM[r,c] is illustrated in FIG. 9 for A=0.25, and the matrices TxMMIN-and TxMMAX illustrated in FIG. 8 for the two data types T1 and T2. From the Matrices illustrated in FIG. 9:

(1) The number of misses to a partitioned cache of size 32, (such as illustrated in FIG. 3 with global subcache size of 16, data type-T1 subcache size of 8, and data type-T2 subcache size of 8) can be estimated from the matrices illustrated in FIG. 9 by observing that T1AMM[5,4]=38.0 and T2AMM[5,4]=12.0, for an estimated number of misses=38.0+12.0=50.0;

(2) The number of misses to a partitioned cache of size 32 with global subcache size of 0, data type-T1 subcache size of 16, and data type-T2 subcache size of 16 can be estimated from the matrices illustrated in FIG. 9 by observing that T1AMM[0,5]=42.5 and T2AMM[0,5]=15.8, for an estimated number of misses=42.5+15.8=58.3;

(3) The number of misses to a partitioned cache of size 7, with global subcache size of 4, data type-T1 subcache size of 2, and data type-T2 subcache size of 1 can be estimated from the matrices illustrated in FIG. 9 by observing that T1AMM[3,2]=53.0 and T2AMM[3,1]=32.0, for an estimated number of misses=53.0+32.0=85.0; and (4) The number of misses to a partitioned cache of size 0, with global subcache size of 0, data type-T1 subcache size of 0, and data type-T2 subcache size of 0 can be estimated from the matrices illustrated in FIG. 9 by observing that T1AMM[0,0]=98.0 and T2AMM[0,0]=102.0, for an estimated number of misses=98.0+102.0=200.0.

Referring to the Pre-Count-Vectors illustrated in FIG. 5 (with gmax being the value of g in the last row of the Pre-Count-Vector table) and the Approximate Miss Matrices illustrated in FIG. 9, the global subcache size, GS, and the data type subcache sizes, T1S, T2S, . . . , TkS that minimize the estimated number of misses to the cache of size CS tracks can be found by applying ALGORITHM-3 below. ALGORITHM-3 Finding the Best Subcache Sizes.

(1) g=0.

(2) While (g<=gmax)

(a) Find a sequence of positive integers S[g]=r1,r2, . . . , rk such that:

r1,r2, . . . , rk are all between the values 0 and gmax inclusive,

CS >=PCV[g,SS]+PCV[r1,SS]+PCV[r2,SS]+. . . +PCV[rk,SS], and

V[g]=T1AMM[g,r1]+T2AMM[g,r2]+. . . +TkAMM[g,rk] is minimum.

(b) g=g+1

(3) Find the minimum value from the set V[0], V[1], . . . , V[gmax] determined in step 2a above. If V[G] is the minimum value, then GS=PCV[G,SS], and the values of r1, r2, . . . , rk from S[G] determine the subcache sizes to be T1S=PCV[r1,SS 9 , 2S=PCV[r2, SS], . . . , TkS=PCV[rk, SS].

Step 2a of ALGORITHM-3 above is normally solved by procedures common to discrete dynamic programming such as given in the Bellman and Hiller references. However, for a total cache size of 8 and the Approximate Miss Matrices illustrated in FIG. 9, the steps in ALGORITHM-3 can be easily illustrated in FIG. 10. Referring to the table at the top of FIG. 10, the values of g, r1, and r2 which make sense are listed in the 3 columns at the left. The corresponding values of the global subcache Size, GS, the data type subcache Sizes, T1S and T2S, are listed in the next three columns where it can be seen that the sum of all the subcache sizes never exceeds the total cache size of 8. In this example, combinations of GS, T1S, and T2S which add to a number less than eight, such as 2,1,1, or 4,0,2, need not be examined because of the well known property (Ref.-1) of LRU cache replacement which assures that corresponding combinations which do add to eight, such as 2,2,4, or 4,0,4 will always have an equal to or lower number of misses. For each combination of subcache sizes given at the left side of the table, the calculation of the estimated number of misses is given at the right side of the table.

Figure 10:
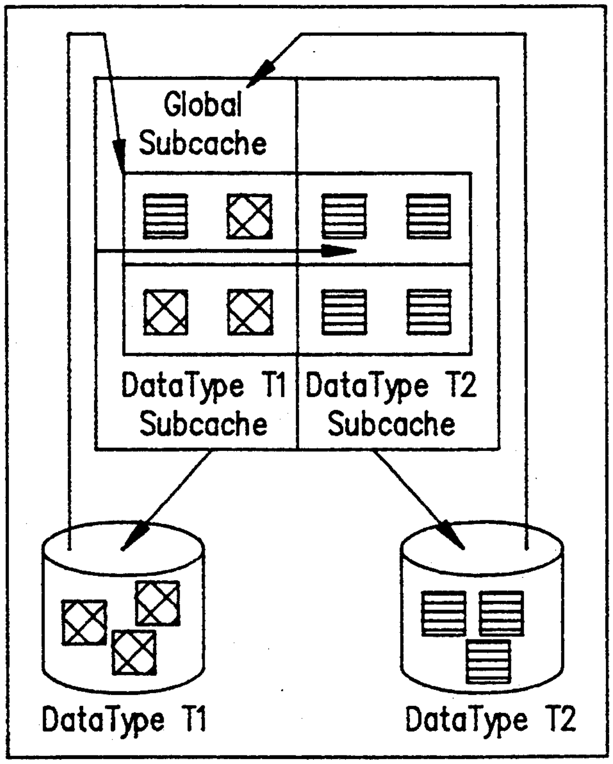
FIG. 10 illustrates the step of determining the best set of subcache sizes to minimize the misses to the cache.

Still referring to the table at the top of FIG. 10, for each value of g there is a minimum estimated number of misses (pointed to by arrows at the right of the table). This minimum value and the sequence of values r1,r2 that produced it is recorded for each value of g at the bottom-left of FIG. 10 as pairs, V[g] and S[g]. Recording these values completes step 2 of ALGORITHM-3.

Referring to the values of V[g] at the bottom-left of FIG. 10, the minimum value of V[g] results when g=2, so S[2] gives the values of r1 and r2 that produced the minimum. The row in the table at the top of FIG. 10 corresponding to g,r1,r2=2,2,3 yields the subcache sizes GS=2,T1S=2,T2S=4 that would tend to minimize the number of misses to the cache for the last N=200 requests to the cache, thus completing step 3 in ALGORITHM-3.

Step 6c in the method of this invention requires that after N requests have been made to the cache, the cache space be allocated to subcaches according to the values obtained in Step 6b above as is described in the copending Mattson application Ser. No. 07/703,308 filed May 20, 1990. For the example illustrated in FIGS. 4-10, a partitioned cache with the indicated subcache sizes is illustrated at the bottom-right of FIG. 10. Changing from one set of subcache sizes to another set of subcache sizes may require items to be pushed or deleted from the cache while other items are pre-fetched into the cache (or alternatively, holes or free space is left in some of the subcaches). Additionally, some items logically or physically located in one subcache may need to be logically or physically moved to another subcache.

However this process is accomplished, in the preferred embodiment of the invention the LRU list and Pre-Count-Vectors illustrated in FIG. 7 are not changed when subcache sizes are changed and the items residing in the various subcaches after changing the subcache sizes (and moving items around) must be consistent with the LRU list. In other words, if GS is the new global subcache Size and T1S, T2S, . . . , TkS are the various new data type subcache Sizes, then the first GS items in the LRU list must be in the global subcache. The LRU list is Marked after GS items and; the first T1S items with data type T1 below the mark must be in the data type-T1 subcache; the first T2S items with data type T2 below the mark must be in the data type-T2 subcache; . . . , and the first TkS items with data type Tk below the mark must be in the data type-Tk subcache. For example, referring to the LRU list in FIG. 7 and the partitioned cache at the bottom-right of FIG. 10, items "26" and "38" would be in the global subcache and a mark would be placed just after item "38" in the LRU list. Items "18" and "46" would be in the data type-T1 subcache and items "14", "97", "32", and "19" would be in the data type-T2 subcache because they are the first 2 and the first 4 items after the LRU list mark with the data types T1 and T2 respectively.

Step 6d in the method of this invention requires that after N requests have been made to the cache, the cache miss counters in the 2*k disjoint sets of counters be set to zero. In the preferred embodiment of the invention the values in the 2*k matrices, T1CMIN, T1CMAX, T2CMIN, T2CMAX, . . . , TkCMIN, and TkCMAX are all set to zero.

Step 7 in the Method of this Invention

Figure 11:
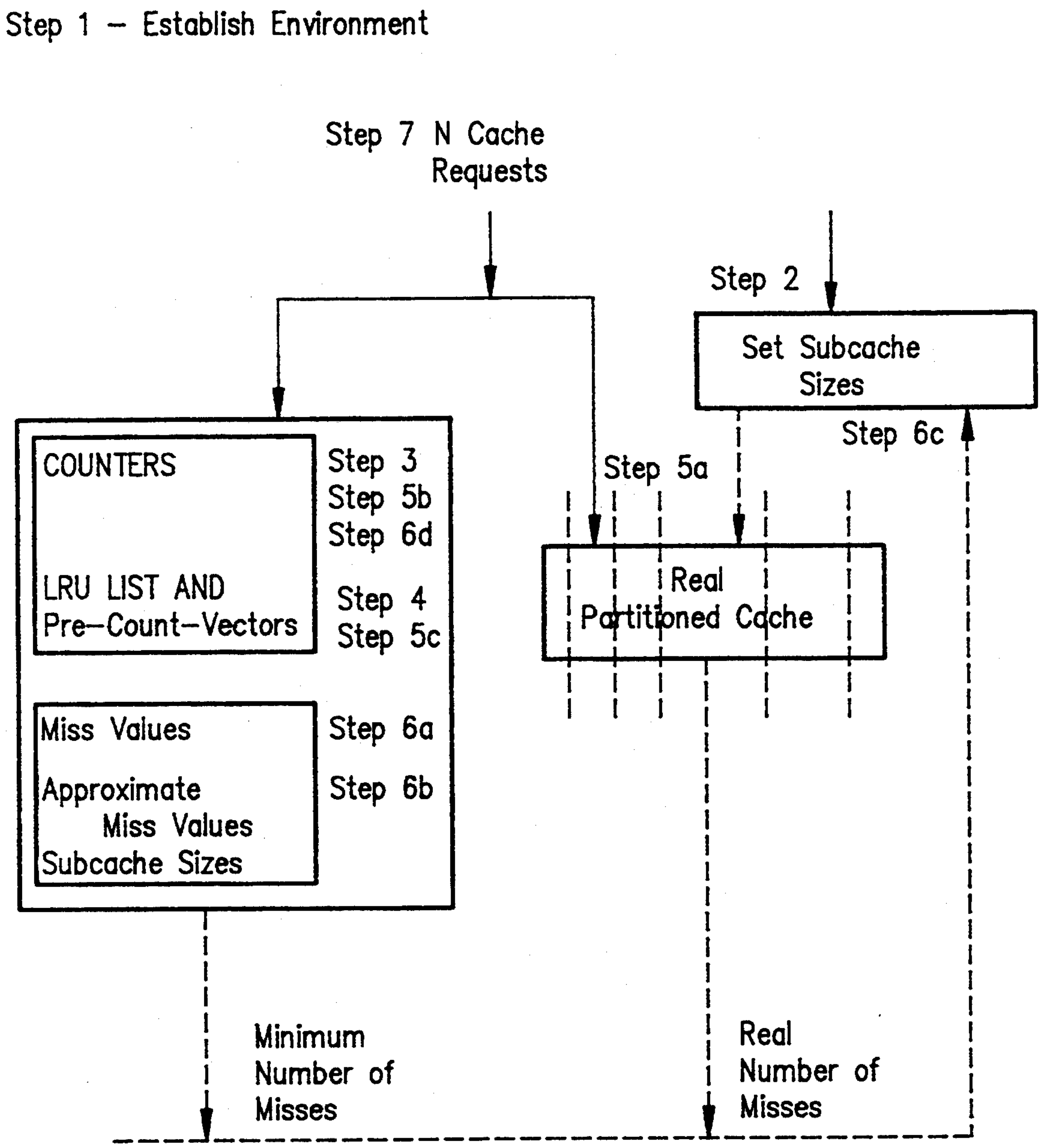
FIG. 11 shows the dynamic space allocation to subcaches in a partitioned cache subsystem with the invention steps indicated next to the subsystem part that it effects.

Step 7 in the method of this invention requires that steps 5a–5c and steps 6a–6d be repeated with possibly a different value of N. FIG. 11 illustrates the invention operating in a system with a partitioned cache. The Steps in the method of the invention are put next to the system part that they effect. Step 1 is necessary to set up the environment of a partitioned cache. Steps 2 and 6c set the subcache sizes. Step 4 initializes the LRU list and Pre-Count-Vectors. Steps 3 and 6d sets to zero the counters needed by the invention. Step 5a measures the real cache performance. Steps 5b, 5c, 6a, and 6b are used by the invention to determine new subcache sizes.

Extensions

Advantageously, the method and means of this invention can be applied to systems having various workload statistical variations over time. For instance, where a system has a statistically stationary workload then the system can be initialized, started, and run with those subcache sizes obtained from a workload trace measured by the method and means of this invention, then it is used to determine the optimal allocation of cache space among the various sub caches. Additionally, the method can be applied to systems that have slowly changing workload statistics by iteratively applying the method to successive short sequences of user generated requests to the cache and producing a dynamically changing set of subcache sizes. In this later case, the method allows the partitioned cache to change its subcache sizes in response to changes in the workload statistics, in an attempt to minimize the total number of misses to the cache.

These and other extensions of the invention may be made without departing from the spirit and scope thereof as recited in the appended claims.

We claim:

1. In a data processing system having a host processor, an external storage system, and a cache management system wherein said cache management system comprises a cache hierarchy and a cache manager, a method for dynamically partitioning a least recently used (LRU) ordered cache hierarchy as a function of a real time reference trace, said cache hierarchy being positioned in a data path coupling said processor to said external storage subsystem, said cache hierarchy including a global and at least one local subcache, said cache hierarchy being operative in a global to local subcache to external storage subsystem destaging direction among referenced objects defined over a plurality of data types, said cache hierarchy being partitioned as to storage space between said global and destaging local caches, each local cache being bound to objects having the same data type, a "hit" being denominated as a comparison match between a reference request and location of the object within a subcache while a "miss" being denominated as the absence of an object within a subcache, comprising the steps of:

(a) recursively, using said cache management system, creating and maintaining LRU lists of referenced objects located in the counterpart subcaches;

(b) recursively, using said cache management system, creating and maintaining a multi-planar array of partition distribution data obtained from said real time reference trace and said LRU lists, each plane in said array having at least the integer dimensions of global subcache size, local subcache size, and data type; and (c) optimally, using said cache management system, resizing the global and local subcache partitions after a predetermined number of cycles in said real time reference trace according to a deterministic dynamic program operated over said array to reflect expected improved performance in said cache hierarchy.

2. The method according to claim 1, wherein step (b) includes 2*k disjoint sets of counters, k sets of said 2*k disjoint sets of counters indicating minimum counts and k sets of said 2*k disjoint sets of counters indicating maximum counts;

further wherein responsive to each request in said real time reference trace, changing the contents of the global subcache to contain the most recently referenced or used (MRU) object by fetching the requested object into the global subcache, and if a global subcache full condition pertains, destaging the LRU object from the global subcache to the local subcache having the same data type as the destaged object; and further wherein responsive to each request in said real time reference trace and to the LRU list and array, incrementing each counter in a subset of counters included within one of the k disjoint subset of counters indicating minimum counts by a predetermined amount; incrementing each counter in a subset of counters included within one of the k disjoint subsets of counters indicating maximum counts by a predetermined amount; and updating the LRU list and array.

3. The method according to claim 2, wherein responsive to a predetermined number N of references in said trace, forming 2*k disjoint subsets of miss values as a function of the counts indicated in the 2*k disjoint sets of counters; determining an allocation of subcache space which would tend to minimize the misses to the cache for the N references; allocating the space in accordance with the determination to among the global and local subcaches.

4. A CPU implemented method for dynamically adjusting portions of a LRU referenceable memory space partitioned among a global subcache storing objects having k different data types and k local subcaches each bound to store objects of a single data type, applications executing on said CPU invoking a supervisory process to manage the subcache referencing, comprising the steps of:

(a) determining, using said supervisory process, an optimal space allocation among the global and local subcaches responsive to a trace of references to objects stored among the subcaches by (1) recursively, using said supervisory process, creating and maintaining LRU lists of said objects located in counterpart subcaches;

(2) recursively, using said supervisory process, creating and maintaining a multi-planar array of partition distribution data obtained from said reference trace and said LRU lists, each plane in said array having at least the integer dimensions of global subcache size, local subcache size, and data type; and (3) optimally, using said supervisory process, resizing the global and local subcache partitions after processing a predetermined number of references in said reference trace according to a deterministic dynamic program operating over said array;

(b) responsive, using said supervisory process, to each reference in said reference trace, LRU ordering the objects in the global subcache and adjusting for overflow in the global to local subcache direction such that an object referenced among the subcaches is placed in the most recently used (MRU) position in the global subcache, and in the event of a subcache full condition, the LRU object in the global subcache is destaged to the local subcache having the same data type; and (c) repeating, using said supervisory process, steps (a) and (b) for request traces of different lengths.

5. The method according to claim 4, wherein step (a)(3) includes arranging a plurality of counters into 2*k disjoint sets such that the counters in each of the disjoint sets form a matrix of r rows and c columns where r is the number of different allowable global subcache sizes and c is the number of different allowable local subcache sizes for a given data type, thereby defining two matrices of counter values for each of the k data types, a first matrix for recording minimum count values and a second matrix for recording maximum count values.

6. The method according to claim 5, wherein the subcache sizes are restricted to zero and any positive integer.

7. The method according to claim 4, wherein step (a)(2) includes creating and maintaining a data structure ancillary to each LRU list and denominated "precount vectors", each LRU list representing a sort of object name and data type in a correlated LRU and grouped order, the precount vectors representing a sort of minimum and maximum numbers of objects in each group by data type in correlated group and subcache size order.

8. The method according either to claims 1 or 4, wherein said method step for optimally resizing the global and local subcache partitions includes the step of obtaining an optimum set of partitions through exhaustive enumeration.

9. In a system having a processor, an external store, and means for establishing a path to data between said processor and external store, said means including a cache management system, said cache management system comprising a cache and a cache manager for maintaining objects referenced in said cache in least recently used (LRU) order, said cache being partitioned into a global cache for storing referenced objects in LRU order over k different data types and k local caches for storing referenced objects in LRU order over a single one of the k data types, said global and local subcaches forming a hierarchy operative in the global to local destaging direction such that any currently referenced object is inserted in the most recently used order in the global subcache, in the event of a cache full condition, overflow is managed by destaging the LRU object in the global subcache to the local subcache having the same data type, wherein the improvement in said means for establishing a path to data comprises:

(a) a plurality of counters arranged into 2*k disjoint sets such that the counters in each of the disjoint sets form a matrix of r rows and c columns where r is the number of different allowable global subcache sizes and c is the number of different allowable local subcache sizes for a given data type, thereby defining two matrices of counter values for each of the k data types, a first matrix for recording minimum count values and a second matrix for recording maximum count values;

(b) said cache management system comprising means responsive to a real time reference trace for recursively creating and maintaining LRU lists of said objects and associated data structures representing inverted sorted orders of subsets of the lists, said lists and structures being counterpart to each of the subcaches;

(c) said cache management system comprising means for recursively creating and maintaining a multiplanar array of partition distribution data obtained from said real time reference trace and said LRU lists and structures data in said counter matrices; and (d) said cache management system comprising means for optimally resizing the global and local subcache partitions after processing a predetermined number of references in said real time reference trace according to a deterministic dynamic program operating over said array.

* * * * *